United States Patent [19]

Machida et al.

[11] Patent Number: 5,767,800
[45] Date of Patent: Jun. 16, 1998

[54] MOVING-PICTURE SIGNAL ENCODING AND RELATED DECODING

[75] Inventors: Yutaka Machida; Koji Imura, both of Yokohama, Japan

[73] Assignee: Matsushita Electrical Industrial Co., Ltd., Osaka, Japan

[21] Appl. No.: 651,238

[22] Filed: May 22, 1996

[30] Foreign Application Priority Data

Jun. 2, 1995 [JP] Japan ................................ 7-137055

[51] Int. Cl.⁶ .................................................. H04N 7/24
[52] U.S. Cl. .................................................. 341/67; 348/423
[58] Field of Search ................................ 341/50, 67, 94; 348/423, 384

[56] References Cited

U.S. PATENT DOCUMENTS

| | | | |
|---|---|---|---|
| 3,971,888 | 7/1976 | Ching et al. | 178/69.5 |
| 5,446,744 | 8/1995 | Nagasawa et al. | 371/37.4 |
| 5,600,374 | 2/1997 | Shikakura | 348/398 |

OTHER PUBLICATIONS

"Interframe Coding Following Motion" by Yasuo Taki et al; The anniversary meeting of Japanese Society of Electronics and Information Communications of the 1974 fiscal year; p. 1263 (w/partial English translation).

"Transformation Coefficient (TCOEFF)": V–3 JT–H261; pp. 594–599 (w/English translation).

"Slicing"; MPEG Technology; Dec. 21, 1993; pp. 39–40 (w/English translation).

"Relation between the Karhunen Loeve and cosine transforms" by R.J. Clarke; IEE Proc., vol. 128, Pt. F. No. 6 Nov. 1981; pp. 359–360.

*Primary Examiner*—Jeffrey A. Gaffin
*Assistant Examiner*—Peguy JeanPierre
*Attorney, Agent, or Firm*—Pollock, Vande Sande & Priddy

[57] ABSTRACT

An input picture signal is divided into blocks. The blocks are grouped into groups each having a plurality of blocks. The input picture signal is encoded into a second picture signal block by block. The second picture signal uses a variable length code. An error correction signal is added to the second picture signal for each of the groups. A signal of a start address and a signal of a location address are added to the second picture signal for each of the groups. The start address represents a position of a bit within each of the groups. The location address representing a spatial position of a block within each of the groups.

11 Claims, 7 Drawing Sheets

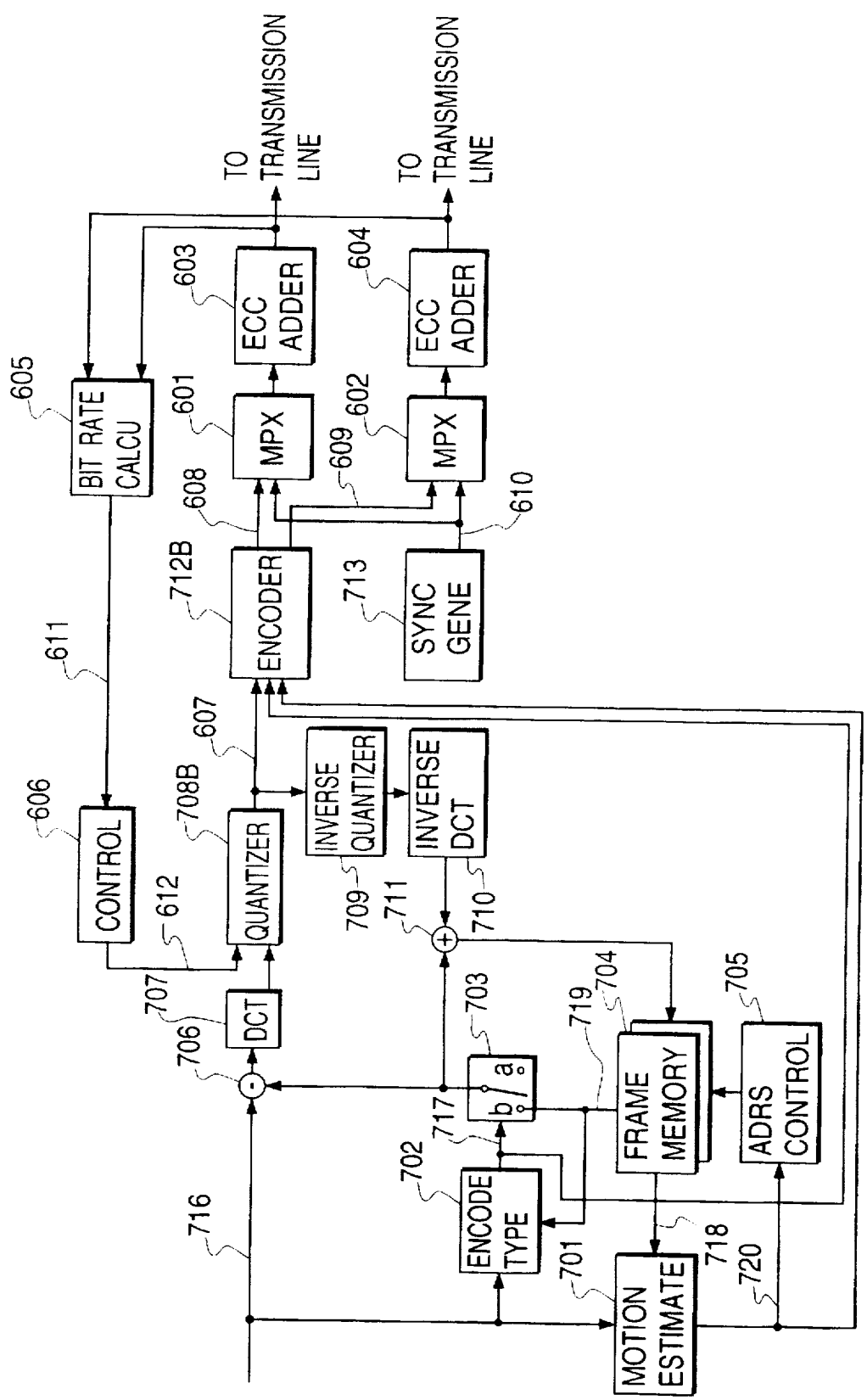

MOVING-PICTURE SIGNAL ENCODING AND RELATED DECODING

BACKGROUND OF THE INVENTION

1. Field of the Invention

This invention relates to a method and apparatus for encoding a moving-picture signal. This invention also relates to a method and apparatus for decoding an encoding-resultant signal back to an original moving-picture signal.

2. Description of the Prior Art

It is well-known that motion-compensated inter-frame predictive encoding enables the compression of a moving-picture signal. The motion-compensated inter-frame predictive encoding uses a temporal correlation in a moving picture. It is also well-known to use discrete cosine transform (DCT) in compressing a moving-picture signal. The DCT-based technique uses a spatial correlation in a moving picture.

According to a typical type of highly-efficient encoding of a moving-picture signal, a signal which results from DCT is quantized, and a quantization-resultant signal is subjected to an entropy encoding process. The entropy encoding process uses a statistical correlation in a moving picture, and enables the compression of the moving-picture signal.

In the typical type of highly-efficient encoding, every frame represented by a moving-picture signal is divided into blocks of a same size, and signal processing is executed block by block. A known way of increasing the ability to withstand signal errors, which occur during the transmission of moving-picture information, includes a step of providing groups each having a plurality of successive signal blocks, and a step of adding a sync signal to the head of every group. Such a block group corresponds to a slice defined in the MPEG 2 standards (the Moving Picture Experts Group 2 standards). The block group is also referred to as a GOB (a group of blocks).

Errors tend to occur in an information signal during the transmission thereof. A well-known way of enabling a reception side to correct such errors is that a transmission side adds an error correction signal to an information signal before the transmission of a resultant composite signal. The reception side extracts the error correction signal from the received composite signal, and corrects errors in the information signal in response to the extracted error correction signal.

SUMMARY OF THE INVENTION

It is a first object of this invention to provide an improved method of encoding a moving-picture signal.

It is a second object of this invention to provide an improved apparatus for encoding a moving-picture signal.

It is a third object of this invention to provide an improved method of decoding an encoding-resultant signal back to an original moving-picture signal.

It is a fourth object of this invention to provide an improved apparatus for decoding an encoding-resultant signal back to an original moving-picture signal.

A first aspect of this invention provides a method of encoding a picture signal which comprises the steps of dividing an input picture signal into blocks; grouping the blocks into groups each having a plurality of blocks; encoding the input picture signal into a second picture signal block by block, the second picture signal using a variable length code; adding an error correction signal to the second picture signal for each of the groups; and adding a signal of a start address and a signal of a location address to the second picture signal for each of the groups, the start address representing a position of a bit within each of the groups, the location address representing a spatial position of a block within each of the groups.

A second aspect of this invention is based on the first aspect thereof, and provides a method wherein each of the groups has a fixed number of bits.

A third aspect of this invention provides a method comprising the steps of detecting a sync signal in an input bit sequence; detecting a signal of a location address and a signal of a start address in the input bit sequence in response to the detected sync signal; recognizing a bit within a block in the input bit sequence as a start bit within the block in response to the location address and the start address, the bit being denoted by the start address, the block being denoted by the location address; and decoding the input bit sequence in response to a result of said recognizing.

A fourth aspect of this invention is based on the third aspect thereof, and provides a method wherein the sync-signal detecting step comprises detecting a sync signal in the input bit sequence for each fixed number of bits, calculating a number of errors in the detected sync signal, comparing the calculated number of errors with a predetermined reference number, and regarding the detected sync signal as a correct sync signal when the calculated number of errors is smaller than the predetermined reference number.

A fifth aspect of this invention provides an apparatus for encoding a picture signal which comprises means for dividing an input picture signal into blocks; means for grouping the blocks into groups each having a plurality of blocks; means for encoding the input picture signal into a second picture signal block by block, the second picture signal using a variable length code; means for adding an error correction signal to the second picture signal for each of the groups; means for generating a signal of a start address representing a position of a bit within each of the groups; means for generating a signal of a location address representing a spatial position of a block within each of the groups; and means for adding the signal of the start address and the signal of the location address to the second picture signal for each of the groups.

A sixth aspect of this invention provides a decoding apparatus comprising means for detecting a sync signal in an input bit sequence; means for calculating a number of errors in the detected sync signal; means for comparing the calculated number of errors with a predetermined reference number; means for regarding the detected sync signal as a correct sync signal when the comparing means decides that the calculated number of errors is smaller than the predetermined reference number; means for detecting a signal of a location address and a signal of a start address in the input bit sequence in response to the detected sync signal which is regarded as the correct sync signal; means for recognizing a bit within a block in the input bit sequence as a start bit within the block in response to the location address and the start address, the bit being denoted by the start address, the block being denoted by the location address; and means for decoding the input bit sequence in response to a result of said recognizing.

A seventh aspect of this invention provides a method of encoding a picture signal which comprises the steps of encoding an input picture signal into a second picture signal using a variable length code; adding an error correction signal to the second picture signal to convert the second picture signal into a third picture signal; detecting a rate of occurrence of bits in the third picture signal; and controlling a rate of occurrence of bits in the second picture signal in response to the detected rate of occurrence of bits in the third picture signal.

An eighth aspect of this invention provides an apparatus for encoding a picture signal which comprises means for encoding an input picture signal into a second picture signal using a variable length code; means for adding an error correction signal to the second picture signal to convert the second picture signal into a third picture signal; means for detecting a rate of occurrence of bits in the third picture signal; and means for controlling a rate of occurrence of bits in the second picture signal in response to the detected rate of occurrence of bits in the third picture signal.

A ninth aspect of this invention provides an apparatus comprising means for dividing a first picture signal into blocks; means for encoding the first picture signal into a second picture signal for each of the blocks, the second picture signal using a variable length code; means for grouping blocks of the second picture signal into groups including first and second groups, wherein the blocks of the second picture signal includes first, second, and third blocks, and wherein the first group includes a succession of the first block and a former part of the second block while the second group includes a succession of a latter part of the second block and the third block; means for generating a signal of a start address representing a position of a head of the third block relative to the second group; means for adding the signal of the start address to the second group in the second picture signal to convert the second picture signal to a third picture signal; and means for generating an error correction signal with respect to the third picture signal for each of the groups, and adding the generated error correction signal to the third picture signal for each of the groups.

A tenth aspect of this invention is based on the ninth aspect thereof, and provides an apparatus further comprising means for generating a signal of a location address representing a position of the third block relative to a frame represented by the first picture signal, and means for adding the signal of the location address to the second group in the second picture signal.

An eleventh aspect of this invention provides an apparatus comprising means for detecting a signal of a start address in each of block groups in a picture signal; means for detecting a head of a first undivided block in each of the block groups in response to the detected signal of the start address; and means for decoding the picture signal for each of the block groups in response to the detected head of the first undivided block.

BRIEF DESCRIPTION OF THE DRAWINGS

FIG. 8 is a block diagram of an encoding apparatus according to a third embodiment of this invention.

DESCRIPTION OF THE PREFERRED EMBODIMENTS

First Embodiment

The QCIF (quarter common intermediate format) is used as a video format. According to the QCIF, every picture frame has 176 pixels by 144 pixels. In addition, every picture frame related to a luminance signal is divided into macro-blocks each having 16 pixels by 16 pixels. Further, every picture frame related to color difference signals is divided into macro-blocks each having 8 pixels by 8 pixels. An error correction signal uses a Bose and Ray-Chaudhuri (BCH) code of the (511, 493) type.

Figure 1:
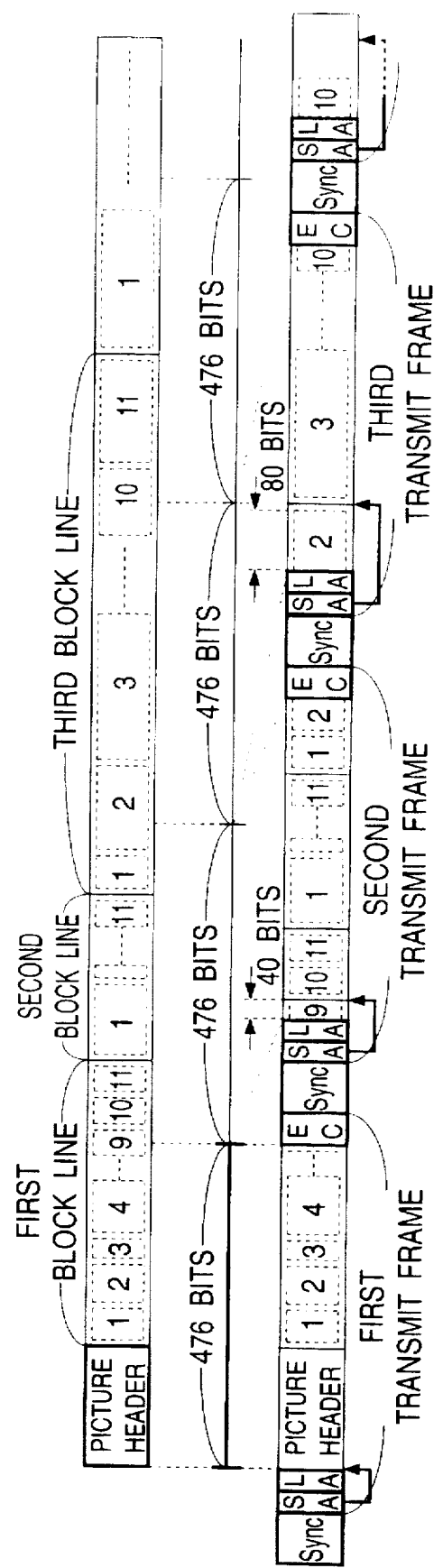
FIG. 1 is a diagram of an example of the structure of a bit sequence in a first embodiment of this invention.

With reference to FIG. 1, a bit sequence representing a moving picture is divided into segments each having 476 successive bits. A 9-bit start address SA and an 8-bit location address LA are added to every bit-sequence segment. An 18-bit error correction signal EC is added to every 493-bit combination of a bit-sequence segment, a start address SA, and a location address LA. Every 511-bit combination of a bit-sequence segment, a start address SA, a location address LA, and an error correction signal EC constitutes one transmission frame (referred to as one group). In every transmission frame, a start address SA, a location address LA, a bit-sequence segment, and an error correction signal EC are sequentially arranged in the order. A 16-bit sync signal is added to every transmission frame. In a resultant bit sequence, sync signals are placed between transmission frames. The resultant bit sequence is transmitted from an encoding side to a decoding side.

Figure 2:
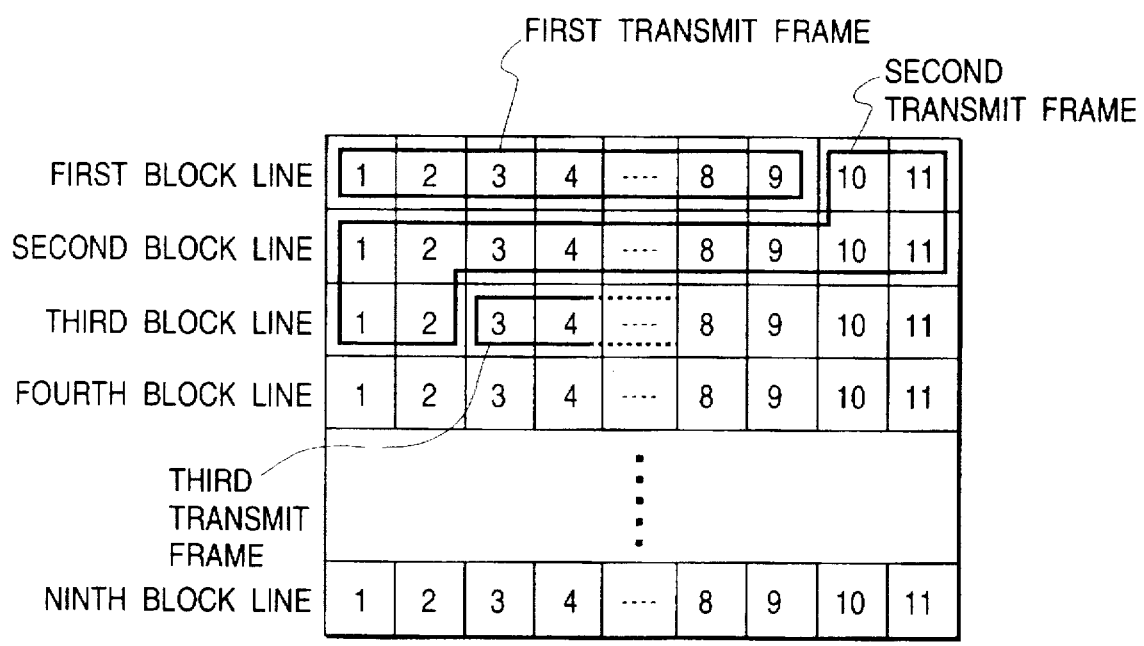
FIG. 2 is a diagram of an example of the relation among a picture frame, transmission frames, and macro-blocks in the first embodiment of this invention.

The following conditions are now assumed. As shown in FIG. 1, a first transmission frame contains 1-st to 8-th macro-blocks and also a former part of a 9-th macro-block in a first block line. A second transmission frame contains a latter part of the 9-th macroblock and also 10-th and 11-th macro-blocks in the first block line. The second transmission frame further contains 1-st to 11-th macro-blocks in a second block line, and a 1-st macro-block and also a former part of a 2-nd macro-block in a third block line. A third transmission frame contains a latter part of the 2-nd macro-block and also 3-rd to 9-th macro-blocks in the third block line. The third transmission frame further contains a former part of a 10-th macro-block in the third block line. Under these assumed conditions, the first, second, and third transmission frames occupy regions in a picture frame as shown in FIG. 2.

Terms, "a divided macro-block" and "an undivided macro-block", are now introduced. A divided macro-block means a macro-block divided into two parts which are in two successive transmission frames respectively. Under the conditions in FIG. 1, the 9-th macro-block in the first block line is an example of the divided macro-block. An undivided macro-block means a macro-block fully contained in one transmission frame. Under the conditions in FIG. 1, the 10-th macro-block in the first block line is an example of the undivided macro-block.

It is now further assumed that the latter part of the 9-th macro-block in the first block line which is contained in the second transmission frame has 40 bits. As shown in FIG. 1, the 40 bits in the latter part of the 9-th macro-block in the first block line follow the start address SA and the location address LA of the second transmission frame. In the second transmission frame, the 10-th macro-block in the first block line starts from a 58-th bit place with respect to the head of the second transmission frame since it is preceded by 57bits composed of the 9-bit start address SA, the 8-bit location address LA, and the 40 bits of the 9-th macro-block.

Accordingly, the start address SA of the second transmission frame is set to a state representing a bit place of "58" (the 58-th bit place) measured from the head of the second transmission frame. In addition, the location address LA of the second transmission frame is set to a state of [1, 10] which represents the "10-th" macro-block in the "1-st" block line.

It is now further assumed that the latter part of the 2-nd macro-block in the third block line which is contained in the third transmission frame has 80 bits. As shown in FIG. 1, the 80 bits in the latter part of the 2-nd macro-block in the third block line follow the start address SA and the location address LA of the third transmission frame. In the third transmission frame, the 3-rd macro-block in the third block line starts from a 98-th bit place with respect to the head of the third transmission frame since it is preceded by 97 bits composed of the 9-bit start address SA, the 8-bit location address LA, and the 80 bits of the 2nd macro-block.

Accordingly, the start address SA of the third transmission frame is set to a state representing a bit place of "98 " (the 98-th bit place) measured from the head of the third transmission frame. In addition, the location address LA of the third transmission frame is set to a state of [3, 3 ] which represents the "3-rd" macro-block in the "3-rd" block line.

In this way, the start address SA of every transmission frame represents a bit position from which a first undivided macro-block starts. In addition, the location address LA of the transmission frame represents the position of the first undivided macro-block relative to the related picture frame.

As understood from the previous description, transmission frames corresponding to macro-block groups have a fixed length or a given number of bits. Accordingly, frames for the error correction process can be accorded with the macro-block group length. Thus, sync signals can be used in common for error-correction frames and macro-block group frames (transmission frames). This is advantageous in reducing an amount of used sync signals.

Figure 3:
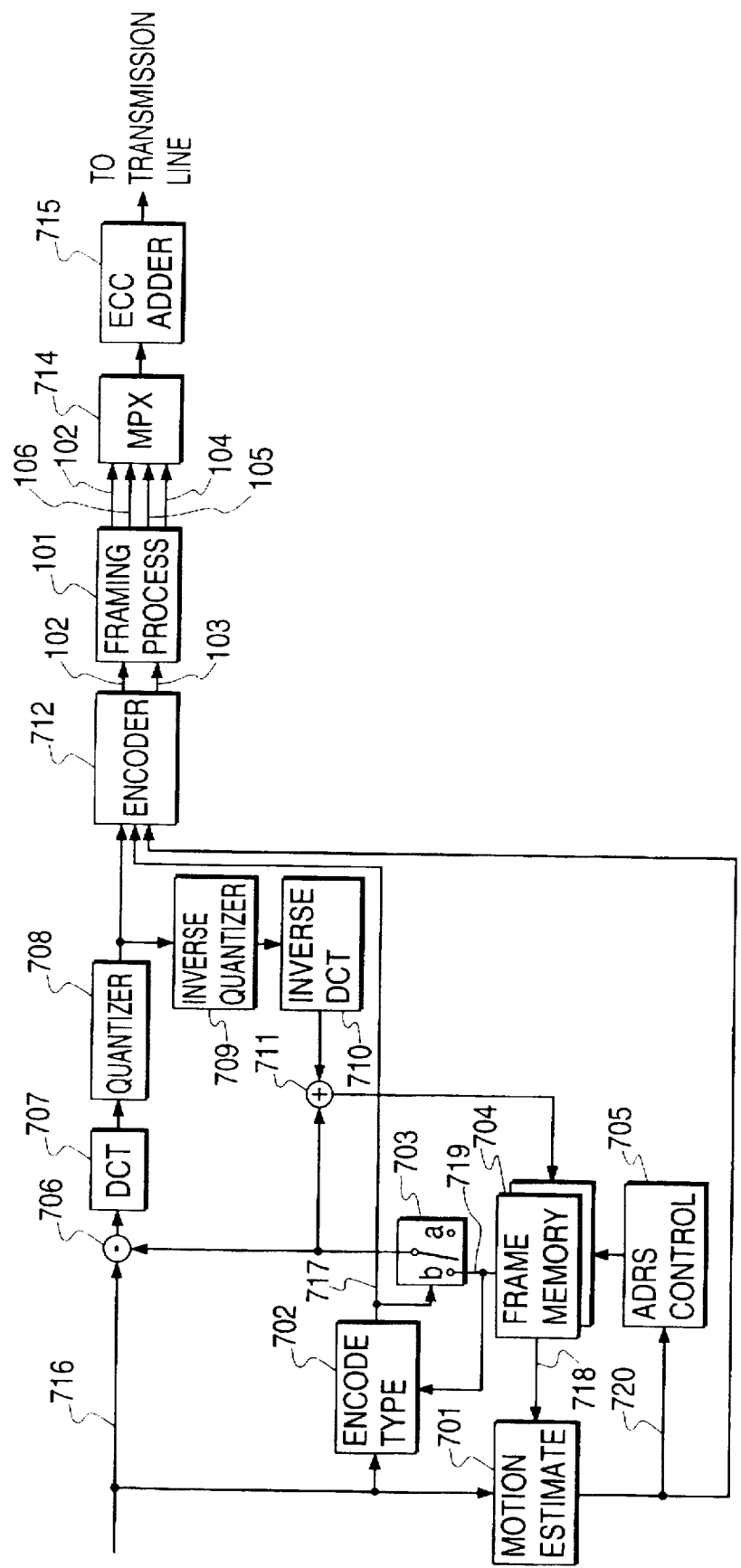
FIG. 3 is a block diagram of an encoding apparatus in the first embodiment of this invention.

With reference to FIG. 3, an encoding apparatus includes a motion vector estimator 701 and an encoding-type deciding device 702 which receive an input signal 716 representing a moving picture. The encoding apparatus of FIG. 3 also includes a switch 703, a frame memory 704, an address controller 705, a subtracter 706, a discrete cosine transform (DCT) device 707, a quantizer 708, an inverse quantizer 709, an inverse DCT device 710, an adder 711, and an encoder 712.

The motion vector estimator 701 is connected to the frame memory 704, the address controller 705, and the encoder 712. The encoding-type deciding device 702 is connected to the switch 703, the frame memory 704, and the encoder 712. The switch 703 is connected to the frame memory 704, the subtracter 706, and the adder 711. The frame memory 704 is connected to the address controller 705 and the adder 711. The subtracter 706 receives the input picture signal 716. The subtracter 706 is connected to the DCT device 707. The DCT device 707 is connected to the quantizer 708. The quantizer 708 is connected to the inverse quantizer 709 and the encoder 712. The inverse quantizer 709 is connected to the inverse DCT device 710. The inverse DCT device 710 is connected to the adder 711.

The encoding apparatus of FIG. 3 further includes a framing processor 101, a multiplexer 714, and an error-correction-code adder 715. The framing processor 101 is connected to the encoder 712. The multiplexer 714 is connected to the framing processor 101. The error-correction-code adder 715 is connected to the multiplexer 714.

The motion vector estimator 701 receives the input picture signal 716 representing a current picture frame. The motion vector estimator 701 receives an output signal 718 of the frame memory 704 which represents an immediately preceding picture frame related to the input picture signal 716. The motion vector estimator 701 compares the current picture frame signal 716 and the immediately-preceding picture frame signal 718, thereby detecting a motion estimate (motion vectors) and outputting a signal 720 representing the detected motion estimate (the detected motion vectors). In other words, the motion vector estimator 701 functions to estimate a picture motion and generate a signal representing the estimated picture motion.

The address controller 705 receives the motion vector signal 720 from the motion vector estimator 701. The address controller 705 controls the frame memory 704 in response to the motion vector signal 720 so that the frame memory 704 outputs a motion-compensated predictive picture signal 719 corresponding to the input picture signal 716.

The encoding-type deciding device 702 receives the input picture signal 716. The encoding-type deciding device 702 receives the predictive picture signal 719 from the frame memory 704. The encoding-type deciding device 702 compares the input picture signal 716 and the predictive picture signal 719, thereby deciding which of an intra-frame encoding process and an inter-frame encoding process should be executed. The encoding-type deciding device 702 outputs an encoding mode signal 717 depending on the result of the decision.

The switch 703 has a movable contact and fixed contacts "a" and "b". The movable contact selectively touches either the fixed contact "a" or the fixed contact "b". The movable contact of the switch 703 is connected to the subtracter 706 and the adder 711.

The fixed contact "a" of the switch 703 has no connection. The fixed contact "b" of the switch 703 is connected to the frame memory 704. The switch 703 is controlled by the encoding mode signal 717 outputted from the encoding-type deciding device 702.

In the case where the encoding mode signal 717 represents that the intra-frame encoding process should be executed, the movable contact of the switch 703 is in touch with the fixed contact "a" thereof. Accordingly, in this case, the predictive picture signal 719 outputted by the frame memory 704 is inhibited from traveling to the subtracter 706 and the adder 711. In the case where the encoding mode signal 717 represents that the inter-frame encoding process should be executed, the movable contact of the switch 703 is in touch with the fixed contact "b" thereof. Accordingly, in this case, the predictive picture signal 719 is allowed to travel from the frame memory 704 to the subtracter 706 and the adder 711.

In the case where the inter-frame encoding process is selected, the subtracter 706 calculates the difference between the input picture signal 716 and the predictive picture signal 719. The subtracter 706 outputs an error signal representing the calculated difference. In the case where the intra-frame encoding process is selected, the input picture signal 716 passes through the subtracter 706 without being processed thereby.

The DCT device 707 receives the output signal of the subtracter 706. The DCT device 707 subjects the output signal of the subtracter 706 to discrete cosine transform (DCT), thereby outputting a signal representing DCT coefficients. Specifically, the DCT device 707 divides the output signal of the subtracter 706 into blocks each corresponding to, for example, 8 pixels by 8 pixels. The DCT is executed block by block. The quantizer 708 receives the DCT coefficient signal from the DCT device 707, and quantizes the DCT coefficient signal in accordance with a suitable quantization step size. The quantizer 708 outputs the quantization-resultant signal.

The encoder 712 receives the quantization-resultant signal from the quantizer 708. The encoder 712 receives the motion vector signal 720 from the motion vector estimator 701. The encoder 712 receives the encoding mode signal 717 from the encoding-type deciding device 702. The encoder 712 includes a first encoding section operating on the quantization-resultant signal, a second encoding section operating on the motion vector signal 720, a third encoding section operating on the encoding mode signal 717, and a multiplexing section. Specifically, the device 712 encodes the quantization-resultant signal into corresponding words of a variable length code, that is, a first encoding-resultant signal. The device 712 encodes the motion vector signal 720 into corresponding words of a variable length code, that is, a second encoding-resultant signal. The device 712 encodes the encoding mode signal 717 into corresponding words of a variable length code, that is, a third encoding-resultant signal. The encoder 712 multiplexes the first encoding-resultant signal, the second encoding-resultant signal, and the third encoding-resultant signal into a bit sequence 102. The encoder 712 outputs the bit sequence 102.

The encoder 712 has a section for dividing the quantization-resultant signal into macro-blocks (MB). Accordingly, the bit sequence 102 is similarly divided into macro-blocks (MB). The encoder 712 executes the processing or the encoding of the quantization-resultant signal macro-block by macro-block. The encoder 712 further has a section for generating a signal 103 representing the end of the processing of every macro-block (MB). The encoder 712 outputs the MB end signal 103.

The inverse quantizer 709 receives the quantization-resultant signal from the quantizer 708. The device 709 subjects the quantization-resultant signal to an inverse quantization process, thereby recovering a DCT coefficient signal corresponding to the output signal of the DCT device 707. The inverse DCT device 710 receives the recovered DCT coefficient signal from the inverse quantizer 709. The device 710 subjects the recovered DCT coefficient signal to inverse DCT, thereby converting the DCT coefficient signal back to an error signal corresponding to the output signal of the subtracter 706. The inverse DCT device 710 outputs the error signal to the adder 711. In the case where the inter-frame encoding process is selected, the adder 711 receives the predictive picture signal 719 from the frame memory 704 and combines the error signal and the predictive picture signal 719 into a picture signal corresponding to the input picture signal 716. In the case where the intra-frame encoding process is selected, the error signal passes through the adder 711 without being processed thereby. In this way, the adder 711 recovers a picture signal corresponding to the input picture signal 716. The adder 711 outputs the recovered picture signal to the frame memory 704. The recovered picture signal is written into the frame memory 704. The frame memory 704 is controlled by the address controller 705, thereby generating the immediately-preceding picture frame signal 718 and the predictive picture signal 719 on the basis of the recovered picture signal.

The framing processor 101 receives the bit sequence 102 and the MB end signal 103 from the encoder 712. The bit sequence 102 passes through the framing processor 101 substantially without being processed thereby. The framing processor 101 generates a start address signal 104, a sync signal 105, and a location address signal 105 in response to the bit sequence 102 and the MB end signal 103. The start address signal 104 corresponds to a start address SA in FIG. 1. The sync signal 105 corresponds to a sync signal in FIG. 1. The location address signal 105 corresponds to a location address LA in FIG. 1.

The multiplexer 714 receives the bit sequence 102, the start address signal 104, the sync signal 105, and the location address signal 106 from the framing processor 101. The device 714 multiplexes the bit sequence 102, the start address signal 104, the sync signal 105, and the location address signal 106 into a first composite information signal. During the signal processing by the multiplexer 714, the bit sequence 102 is divided into transmission frames referred to as macro-block groups. The device 714 executes the multiplexing group by group (transmission-frame by transmission-frame).

The error-correction-code adder 715 receives the first composite information signal from the multiplexer 714. The device 715 adds an error correction signal or words of an error correction code to the first composite information signal, thereby converting the first composite information signal into a second composite information signal. The added error correction signal corresponds to an error correction signal EC in FIG. 1. The error-correction code adder 715 outputs the second composite information signal to a transmission line. The second composite information signal has a form shown in FIG. 1.

Figure 4:
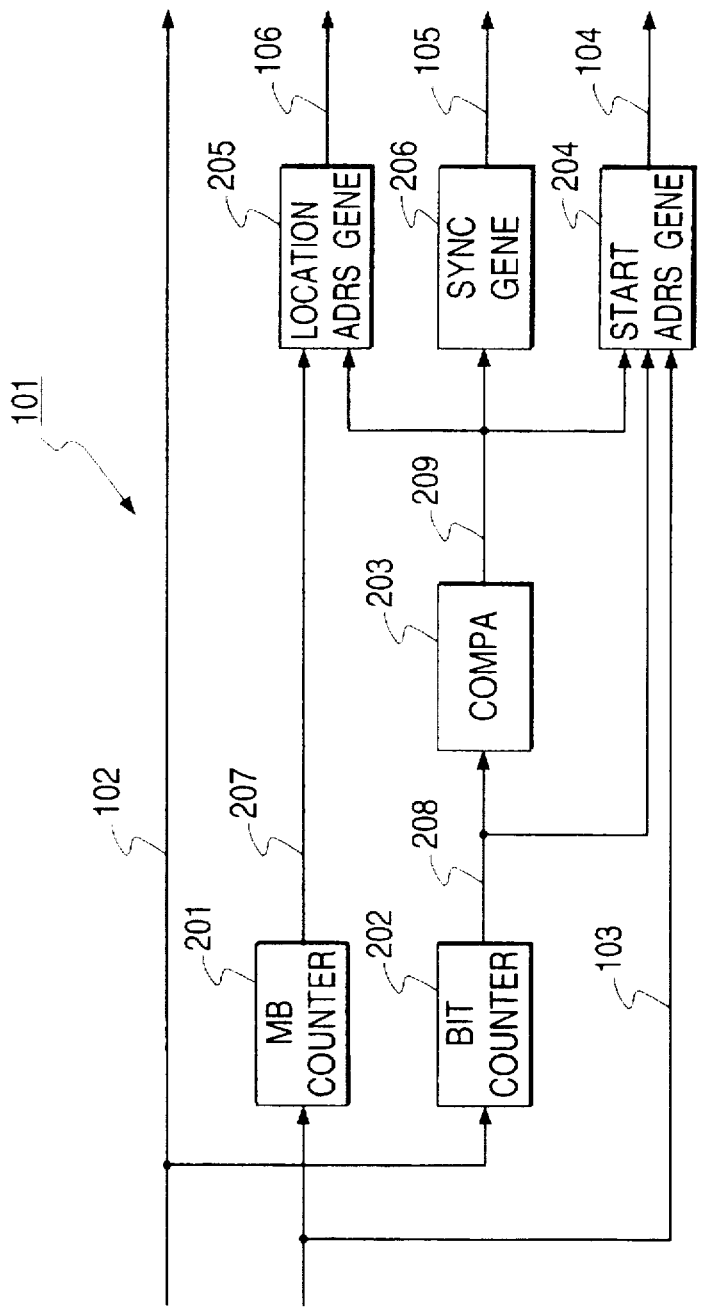
FIG. 4 is a block diagram of a framing processor in FIG. 3.

As shown in FIG. 4, the framing processor 101 includes counters 201 and 202, a comparator 203, and signal generators 204, 205, and 206. The counter 201 receives the MB end signal 103. The counter 201 executes an up-counting process, and specifically counts every macro-block in response to the MB end signal. The counter 201 generates a signal 207 representing the number of counted macro-blocks. The counter 201 outputs the MB count number signal 207. The counter 201 is reset for every picture frame. The counter 202 receives the bit sequence 102. The counter 202 executes an up-counting process, and specifically counts every bit in the bit sequence 102. The counter 202 generates a signal 208 representing the number of counted bits. The counter 202 outputs the bit count number signal 208. The comparator 203 receives the bit count number signal 208 from the counter 202. The comparator 203 is informed of a reference signal representing a fixed value corresponding to a given number of bits, for example, 476 bits. The device 203 compares the bit count number signal 208 with the reference signal, thereby deciding whether or not the number of counted bits reaches the given number of bits (for example, 476 bits). When the number of counted bits reaches the given number of bits, the comparator 203 outputs a comparison result signal 209 in a logic state of "1". Otherwise, the comparator 203 outputs a comparison result signal 209 in a logic state of "0". Generally, the bit count number signal 208 is reset in response to every change of the comparison result signal 209 from "0" to "1".

The signal generator 205 receives the MB count number signal 207 from the counter 201. The signal generator 205 receives the comparison result signal 209 from the comparator 203. The signal generator 205 produces the location address signal 106 in response to the MB count number signal 207 and the comparison result signal 209.

Specifically, for every transmission frame, the signal generator 205 calculates the horizontal and vertical positions of a first undivided macro-block relative to a related picture frame by referring to the MB count number signal 207 provided that the comparison result signal 209 is "1". Accordingly, for every transmission frame, the signal 106 produced by the device 205 represents an 8-bit location address LA corresponding to the horizontal and vertical positions of a first undivided macro-block relative to a related picture frame. The signal generator 206 receives the comparison result signal 209 from the comparator 203.

The signal generator 206 produces the sync signal 105 with 16 bits in response to every change of the comparison result signal 209 from "0" to "1". The signal generator 204 receives the MB end signal 103. The signal generator 204 receives the bit count number signal 208 from the counter 202. The signal generator 204 receives the comparison result signal 209 from the comparator 203. The signal generator 204 produces the start address signal 104 in response to the MB end signal 103, the bit count number signal 208, and the comparison result signal 209. Specifically, the signal generator 204 samples the bit count number signal 208 at a timing provided by every change of the MB end signal 103 to an active state which immediately follows a 0-to-1 change of the comparison result signal 209. For every transmission frame, the sampled bit count number signal 208 represents a bit place from which a first undivided macro-block starts. The signal generator 204 outputs the sampled bit count number signal 208 as the start address signal 104. Accordingly, for every transmission frame, the signal 104 produced by the device 204 represents a 9-bit start address SA corresponding to a bit place from which a first undivided macro-block starts.

Second Embodiment

A second embodiment of this invention relates to decoding an information signal (a bit sequence) from generated by and transmitted from the encoding apparatus of FIG. 3. An input information signal to be decoded has fixed-length transmission frames and sync signals alternating with each other (see FIG. 1). Every transmission frame has a first given number of successive bits, for example, 511 bits.

Every sync signal has a second given number of successive bits, for example, 16 bits. In the signal decoding based on the second embodiment of this invention, every bit in an input information signal is counted, and a detection is made as to a sync signal for every third given number of successive bits (for example, 527 bits equal to 16 bits plus 511 bits).

When a sync signal is normally and correctly detected, an error correction process is started. In the case where a sync signal is not successfully detected, that is, in the case where a detected sync signal disagrees with a correct sync signal, the detected sync signal is compared with the correct sync signal to calculate the number of bits in the detected sync signal which disagree in logic state from corresponding bits in the correct sync signal. The calculated number of such error bits in the detected sync signal is compared with a predetermined threshold number (a predetermined threshold value). In the case where the number of error bits in the detected sync signal is equal to or smaller than the threshold number, a synchronization process is implemented and established in response to the detected sync signal, and then an error correction process is started. In the case where the number of error bits in the detected sync signal exceeds the threshold number, the synchronization process is inhibited from being implemented and established in response to the detected sync signal. In this case, a next sync signal is waited.

Regarding every transmission frame (every macro-block group) in a bit sequence which results from the error correction process, bits prior to the bit place represented by a start address SA are remaining bits in a final macro-block (a divided macro-block) in the immediately-preceding transmission frame. Accordingly, a decoding process on the immediately-preceding transmission frame continues to be executed on the bits prior to the bit place represented by the start address SA in the current transmission frame. On the other hand, a bit in the place represented by the start address SA is a head of a first undivided macro-block in a picture-frame region denoted by a location address LA. Accordingly, a re-synchronization process is executed so that a new decoding process starts at a timing which corresponds to the head of the first undivided macro-block.

The second embodiment of this invention offers the following advantages. Since an input information signal to be decoded has fixed-length transmission frames (fixed-length macro-block groups), it is possible to forcedly implement and establish synchronization even when a detected sync signal has an error or errors. A start address SA and a location address LA enable the fixed-length structure of transmission frames. It is possible to implement re-synchronization at a timing which corresponds to a head of a first undivided macro-block in a picture-frame region denoted by a location address LA. Since frames for the error correction process agree in length with transmission frames (macro-block groups), an uncorrectable error or errors in a transmission frame are inhibited from interfering with the decoding of other transmission frames.

Figure 5:
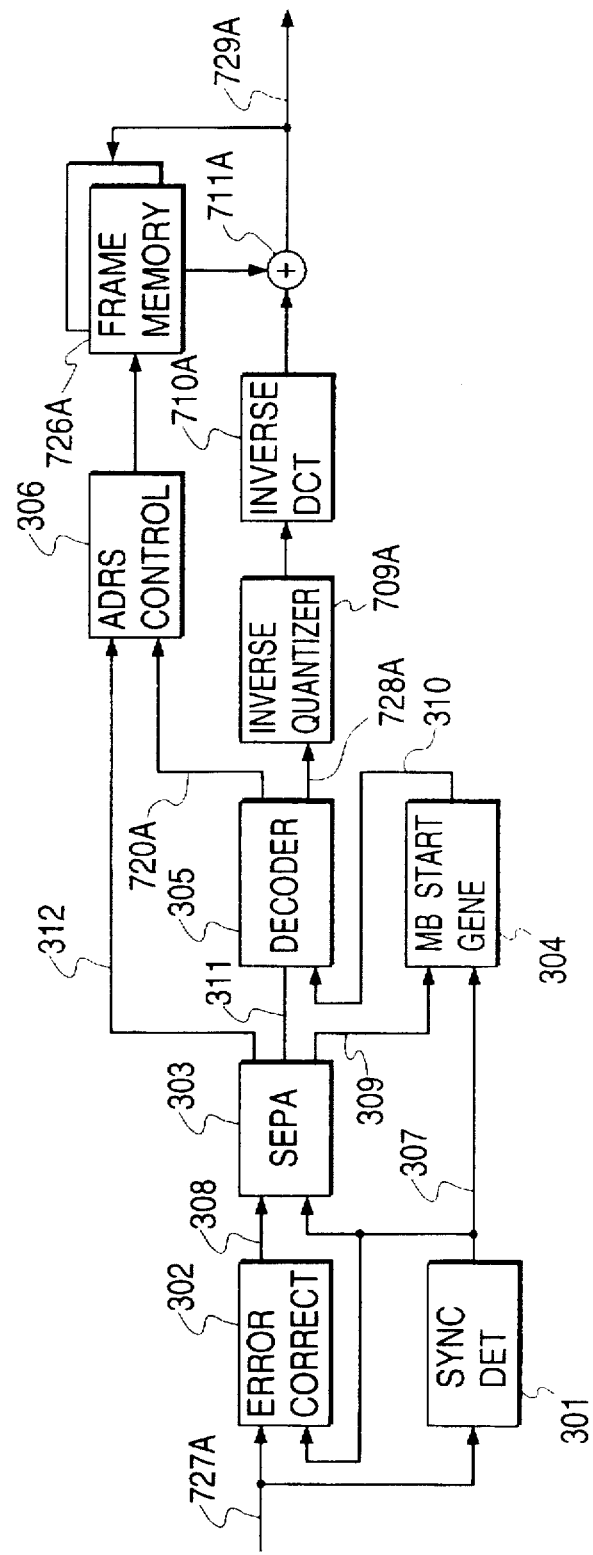
FIG. 5 is a block diagram of a decoding apparatus according to a second embodiment of this invention.

With reference to FIG. 5, a decoding apparatus includes a sync signal detector 301 and an error correction device 302 which receive an input bit sequence 727A representing a moving picture. The decoding apparatus of FIG. 5 also includes a signal separator 303, a signal generator 304, a decoder 305, an address controller 306, an inverse quantizer 709A, an inverse DCT device 710A, an adder 711A, and a frame memory 726A.

The sync signal detector 301 is connected to the error correction device 302, the signal separator 303, and the signal generator 304. The error correction device 302 is connected to the signal separator 303. The signal separator 303 is connected to the signal generator 304, the decoder 305, and the address controller 306. The signal generator 304 is connected to the decoder 305. The decoder 305 is connected to the address controller 306 and the inverse quantizer 709A. The address controller 306 is connected to the frame memory 726A. The inverse quantizer 709A is connected to the inverse DCT device 710A. The inverse DCT device 710A is connected to the adder 711A. The adder 71 1A is connected to the frame memory 726A.

The sync signal detector 301 receives the input bit sequence 727A. The device 301 detects every sync signal in the input bit sequence 727A, and generates a signal 307 representative of a sync detection flag in response to the detected sync signal. The sync signal detector 301 outputs the sync detection flag signal 307.

The error correction device 302 receives the input bit sequence 727A. The error correction device 302 receives the sync detection flag signal 307 from the sync signal detector 301. The error correction device 302 implements and establishes transmission-frame synchronization with respect to the input bit sequence 727A in response to the sync detection flag signal 307. For every transmission frame, the error correction device 302 subjects the input bit sequence 727A to an error correction process responsive to an error correction signal contained therein. Accordingly, the error correction device 302 converts the input bit sequence 727A into a correction-resultant bit sequence 308. The error correction device 302 outputs the correction-resultant bit sequence 308. In general, the correction-resultant bit sequence 308 is void of the error correction signal. The transmission-frame synchronization in the error correction process by the error correction device 302 is controlled in response to the sync detection flag signal 307.

The signal separator 303 receives the correction-resultant bit sequence 308 from the error correction device 302. The signal separator 303 receives the sync detection flag signal 307 from the sync signal detector 301. The signal separator 303 implements and establishes transmission-frame synchronization with respect to the correction-resultant bit sequence 308 in response to the sync detection flag signal 307. For every transmission frame, the signal separator 303 removes a sync signal from the correction-resultant bit sequence 308 in response to the sync detection flag signal 307, and separates the correction-resultant bit sequence 308 into a signal 309 representing a start address SA, a signal 312 representing a location address LA, and a signal (a bit sequence) 311 representing picture information. The signal separator 303 outputs the start address signal 309, the location address signal 312, and the bit sequence 311. The transmission-frame synchronization in the signal separation process by the signal separator 303 is controlled in response to the sync detection flag signal 307.

The signal generator 304 receives the sync detection flag signal 307 from the sync signal detector 301. The signal generator 304 receives the start address signal 309 from the signal separator 303. The signal generator 304 produces a signal 310 representative of a macro-block start flag (an MB start flag) in response to the sync detection flag signal 307 and the start address signal 309. The MB start flag signal 310 represents a timing at which a first undivided macro-block starts in every transmission frame. The signal generator 304 outputs the MB start flag signal 310.

The decoder 305 receives the bit sequence 311 from the signal separator 303. The decoder 305 receives the MB start flag signal 310 from the signal generator 304. The decoder 305 includes a demultiplexing section, a first decoding section, and a second decoding section. Specifically, the decoder 305 demultiplexes the bit sequence 311 into a first variable-length-code signal representative of DCT coefficient information and a second variable-length-code signal representative of motion vectors. The device 305 decodes the first variable-length-code signal back into a quantization-resultant signal (a quantization-resultant DCT coefficient signal) 728A. The device 305 decodes the second variable-length-code signal back into a motion vector signal 720A. The decoder 305 outputs the quantization-resultant signal 728A and the motion vector signal 720A. The decoder 305 implements and establishes transmission-frame re-synchronization regarding the demultiplexing process and the decoding process in response to the MB start flag signal 310. The transmission-frame resynchronization enables a new decoding process to start at a timing corresponding to the head of a first undivided macro-block in every transmission frame.

The inverse quantizer 709A receives the quantization-resultant signal 728A from the decoder 305. The device 709A subjects the quantization-resultant signal 728A to an inverse quantization process, thereby recovering a DCT coefficient signal. The inverse quantizer 709A outputs the recovered DCT coefficient signal. The inverse DCT device 710A receives the recovered DCT coefficient signal from the inverse quantizer 709A. The device 710A subjects the recovered DCT coefficient signal to inverse DCT, thereby converting the DCT coefficient signal back to an error signal. The inverse DCT device 710A outputs the error signal.

The address controller 306 receives the location address signal 312 from the signal separator 303. The address controller 306 receives the motion vector signal 720A from the decoder 305. The address controller 306 controls the frame memory 726A in response to the location address signal 312 and the motion vector signal 720A so that the frame memory 726A outputs a motion-compensated predictive picture signal.

The adder 711A receives the error signal from the inverse DCT device 710A. The adder 711A receives the predictive picture signal from the frame memory 726A. The adder 711A combines the error signal and the predictive picture signal into an original picture signal 729A. In this way, the adder 711A recovers the original picture signal 729A. The adder 711A outputs the recovered picture signal 729A.

The recovered picture signal 729A is transmitted from the adder 711A to the frame memory 726A before being written thereinto. The frame memory 726A is controlled by the address controller 306, thereby generating the predictive picture signal on the basis of the recovered picture signal 729A.

Figure 6:
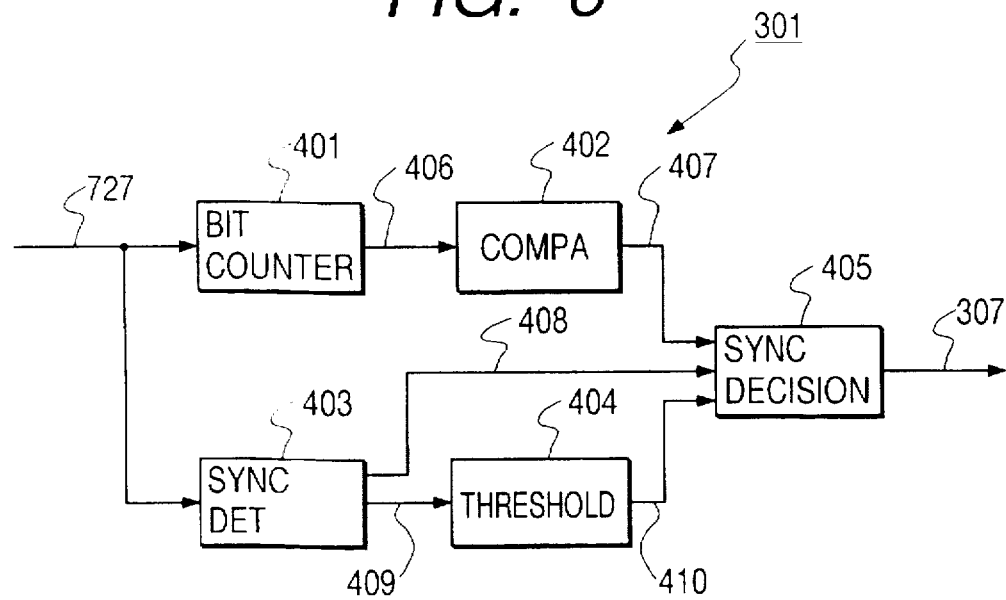
FIG. 6 is a block diagram of a sync signal detector in FIG. 5.

As shown in FIG. 6, the sync signal detector 301 includes a counter 401, a comparator 402, a detecting section 403, a processor 404, and a deciding section 405. The counter 401 receives the input bit sequence 727A. The counter 401 executes an up-counting process, and specifically counts every bit in the input bit sequence 727A. The counter 401 generates a signal 406 representing the number of counted bits. The counter 401 outputs the bit count number signal 406 to the comparator 402. The comparator 402 is informed of a reference signal representing a fixed value corresponding to a given number of bits, for example, 527 bits. The device 402 compares the bit count number signal 406 with the reference signal, thereby deciding whether or not the number of counted bits reaches the given number of bits (for example, 527 bits). When the number of counted bits reaches the given number of bits, the comparator 402 outputs a transmission-frame flag signal 407 in a logic state of "1". Otherwise, the comparator 402 outputs a transmission-frame flag signal 407 in a logic state of "0". Generally, the bit count number signal 406 is reset in response to every change of the transmission-frame flag signal 407 from "0" to "1".

The detecting section 403 receives the input bit sequence 727A. The detecting section 403 includes a comparator. The detecting section 403 compares 16 successive bits in the input bit sequence 727A with a predetermined 16-bit reference sync signal.

The detecting section 403 generates a signal 408 representative of a sync flag and a signal 409 representative of the number of error bits in response to the result of the comparison. The sync flag signal 408 assumes "1" when the 16 successive bits in the input bit sequence 727A completely agree with the predetermined 16-bit reference sync signal. Otherwise, the sync flag signal 408 is "0".

The error-bit number signal 409 represents the number of bits among the 16 bits in the input bit sequence 727A which disagree with the corresponding bits in the predetermined 16-bit reference sync signal. The detecting section 403 outputs the sync flag signal 408 and the error-bit number signal 409.

The processor 404 receives the error-bit number signal 409 from the detecting section 403. The processor 404 includes a comparator. The processor 404 is informed of a reference signal representing a predetermined threshold number (a predetermined threshold value). The processor 404 compares the number of error bits, which is represented by the error-bit number signal 409, with the threshold number. The processor 404 generates a signal 410 representative of a forced sync acquisition flag in response to the result of the comparison. In the case where the number of error bits is equal to or smaller than the threshold number, the forced sync acquisition flag signal 410 is "1". Otherwise, the forced sync acquisition flag signal 410 is "0". The processor 404 outputs the forced sync acquisition flag signal 410.

The deciding section 405 receives the transmission-frame flag signal 407 from the comparator 402. The deciding section 405 receives the sync flag signal 408 from the detecting section 403. The deciding section 405 receives the forced sync acquisition flag signal 410 from the processor 404. The deciding section 405 generates the sync detection flag signal 307 in response to the transmission-frame flag signal 407, the sync flag signal 408, and the forced sync acquisition flag signal 410. The deciding section 405 includes a logic gate array or a ROM. In the case where the deciding section 405 includes a ROM, predetermined states of the sync detection flag signal 307 are stored in storage segments of the ROM respectively, and the transmission-frame flag signal 407, the sync flag signal 408, and the forced sync acquisition flag signal 410 compose an address signal operating on the ROM. When the transmission-frame flag signal 407, the sync flag signal 408, and the forced sync acquisition flag signal 410 are "1", "1", and "1" respectively, the sync detection flag signal 307 is inhibited from being outputted. When the transmission-frame flag signal 407, the sync flag signal 408, and the forced sync acquisition flag signal 410 are "1", "1", and "0" respectively, the sync detection flag signal 307 is "1". When the transmission-frame flag signal 407, the sync flag signal 408, and the forced sync acquisition flag signal 410 are "1", "0", and "1" respectively, the sync detection flag signal 307 is "1".

When the transmission-frame flag signal 407, the sync flag signal 408, and the forced sync acquisition flag signal 410 are "1", "0", and "0" respectively, the sync detection flag signal 307 is "0". When the transmission-frame flag signal 407, the sync flag signal 408, and the forced sync acquisition flag signal 410 are "0", "1", and "1" respectively, the sync detection flag signal 307 is inhibited from being outputted. When the transmission-frame flag signal 407, the sync flag signal 408, and the forced sync acquisition flag signal 410 are "0", "1", and "0" respectively, the sync detection flag signal 307 is "1". When the transmission-frame flag signal 407, the sync flag signal 408, and the forced sync acquisition flag signal 410 are "0", "0", and "1" respectively, the sync detection flag signal 307 is "0". When the transmission-frame flag signal 407, the sync flag signal 408, and the forced sync acquisition flag signal 410 are "0", "0", and "0" respectively, the sync detection flag signal 307 is "0".

The sync detection flag signal 307 being "1" enables the synchronization process to be implemented and established. The sync detection flag signal 307 being "0" inhibits the synchronization process from being implemented and established. In the case where the synchronization process is inhibited, a next sync signal is waited.

Figure 7:
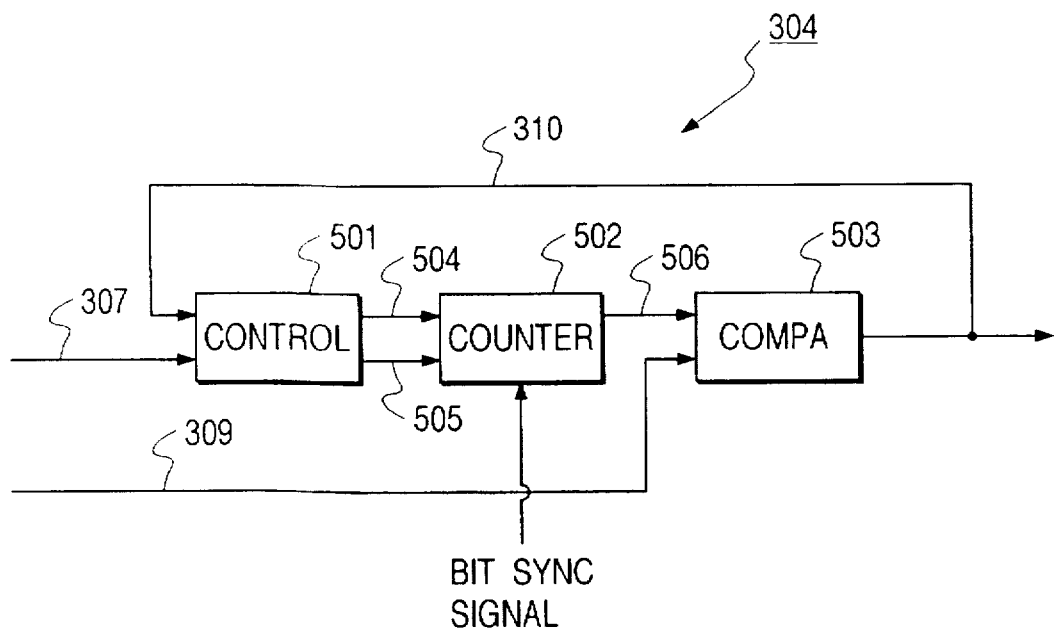
FIG. 7 is a block diagram of a signal generator in FIG. 5.

As shown in FIG. 7, the signal generator 304 includes a controller 501, a counter 502, and a comparator 503. The controller 501 receives the sync detection flag signal 307 from the sync signal detector 301. The controller 501 includes flip flops or bistable circuits. When the sync detection flag signal 307 changes from "0" to "1", the controller 501 outputs a reset signal 504 to the counter 502. At the same time, the controller 501 starts outputting an enable signal 505 to the counter 502. The counter 502 receives a bit sync signal synchronized with the bit sequence 311 outputted from the signal separator 303. The counter 502 is reset in response to the reset signal 504. The enable signal 505 allows the counter 502 to execute an up-counting process. Specifically, the device 502 counts every bit in the bit sequence 311. The counter 502 generates a signal 506 representing the number of counted bits. The counter 502 outputs the bit count number signal 506 to the comparator 503. The comparator 503 receives the start address signal 309 from the signal separator 303. The device 503 compares the bit count number signal 506 with the start address signal 309, thereby deciding whether or not the number of counted bits reaches a given number corresponding to the start address signal 309. When the number of counted bits reaches the given number corresponding to the start address signal 309, the comparator 503 outputs the MB start flag signal 310 in a logic state of "1". Otherwise, the comparator 503 outputs the MB start flag signal 310 in a logic state of "0". The counter 502 and the comparator 503 cooperate to detect remaining bits in a divided macro-block extending over two successive transmission frames. In other words, the counter 502 and the comparator 503 cooperate to detect the start of a first undivided macro-block in the present transmission frame. The MB start flag signal 310 represents a timing at which a first undivided macro-block starts in every transmission frame. The controller 501 receives the MB start flag signal 310 from the comparator 503. The controller 501 interrupts the outputting of the enable signal 505 in response to every change of the MB start flag signal 310 from "0" to "1". Accordingly, the operation of the counter 502 is suspended each time the MB start flag signal 310 changes from "0" to "1".

Third Embodiment

A third embodiment of this invention uses a hierarchical encoding process. An input picture signal to be encoded is separated into DCT coefficient information and overhead information. The overhead information includes information of an encoding mode (an encoding type) and information of motion vectors. A first priority and a second priority are assigned to the overhead information and the DCT coefficient information respectively.

The overhead information is encoded into a variable-length-code signal referred to as a first bit sequence. Sync signals and error correction code signals are added to the first bit sequence. Accordingly, the first bit sequence, the sync signals, and the error correction code signals are combined into a second bit sequence. The second bit sequence is outputted to a transmission line.

The DCT coefficient information is encoded into a variable-length-code signal referred to as a third bit sequence. Sync signals and error correction code signals are added to the third bit sequence. Accordingly, the third bit sequence, the sync signals, and the error correction code signals are combined into a fourth bit sequence. The fourth bit sequence is outputted to a transmission line.

The number of bits composing the error correction code signals added to the overhead information (the first-priority information) is greater than the number of bits composing the error correction code signals added to the DCT coefficient information (second-priority information). Therefore, the overhead information (the first-priority information) is higher than the DCT coefficient information (the second-priority information) in ability to withstand an error or errors which occur during the transmission thereof.

A calculation is made as to the number of bits of the second bit sequence which occur per unit time interval, that is, the rate of the occurrence of bits in the second bit sequence. It should be noted that the second bit sequence relates to the overhead information. Also, a calculation is made as to the number of bits of the fourth bit sequence which occur per unit time interval, that is, the rate of the occurrence of bits in the fourth bit sequence. It should be noted that the fourth bit sequence relates to the DCT coefficient information. Subsequently, the rate of the occurrence of bits in the second and fourth bit sequences is calculated by summing the calculated rates concerning the second and fourth bit sequences respectively.

The variable-length encoding stage related to the DCT coefficient information follows a quantization stage which serves to quantize picture information in accordance with a variable quantization step size. The quantization step size is increased and decreased as the calculated rate of the occurrence of bits in the second and fourth bit sequences rises and drops respectively. The increase and the decrease in the quantization step size cause a drop and a rise in the rate of the occurrence of bits in the fourth bit sequence (the DCT coefficient information). Accordingly, the actual rate of the occurrence of bits in the second and fourth bit sequences is controlled and maintained at essentially a constant rate.

With reference to FIG. 8, an encoding apparatus includes a motion vector estimator 701 and an encoding-type deciding device 702 which receive an input signal 716 representing a moving picture. The encoding apparatus of FIG. 8 also includes a switch 703, a frame memory 704, an address controller 705, a subtracter 706, a discrete cosine transform (DCT) device 707, a quantizer 708B, an inverse quantizer 709, an inverse DCT device 710, an adder 711, and an encoder 712B.

The motion vector estimator 701 is connected to the frame memory 704, the address controller 705, and the encoder 712B. The encoding-type deciding device 702 is connected to the switch 703, the frame memory 704, and the encoder 712B. The switch 703 is connected to the frame memory 704, the subtracter 706, and the adder 711. The frame memory 704 is connected to the address controller 705 and the adder 711. The subtracter 706 receives the input picture signal 716. The subtracter 706 is connected to the DCT device 707. The DCT device 707 is connected to the quantizer 708B. The quantizer 708B is connected to the inverse quantizer 709 and the encoder 712B. The inverse quantizer 709 is connected to the inverse DCT device 710. The inverse DCT device 710 is connected to the adder 711.

The encoding apparatus of FIG. 8 further includes a sync signal generator 713, multiplexers 601 and 602, error-correction-code adders 603 and 604, a calculator 605, and a controller 606. The sync signal generator 713 is connected to the multiplexers 601 and 602. The multiplexers 601 and 602 are connected to the encoder 712B. The error-correction-code adders 603 and 604 are connected to the multiplexers 601 and 602 respectively. The calculator 605 is connected to the error-correction-code adders 603 and 604. The controller 606 is connected to the calculator 605. The controller 606 is also connected to the quantizer 708B.

The motion vector estimator 701 receives the input picture signal 716 representing a current picture frame. The motion vector estimator 701 receives an output signal 718 of the frame memory 704 which represents an immediately preceding picture frame related to the input picture signal 716. The motion vector estimator 701 compares the current picture frame signal 716 and the immediately-preceding picture frame signal 718, thereby detecting a motion estimate (motion vectors) and outputting a signal 720 representing the detected motion estimate (the detected motion vectors). In other words, the motion vector estimator 701 functions to estimate a picture motion and generate a signal representing the estimated picture motion.

The address controller 705 receives the motion vector signal 720 from the motion vector estimator 701. The address controller 705 controls the frame memory 704 in response to the motion 25 vector signal 720 so that the frame memory 704 outputs a motion-compensated predictive picture signal 719 corresponding to the input picture signal 716.

The encoding-type deciding device 702 receives the input picture signal 716. The encoding-type deciding device 702 receives the predictive picture signal 719 from the frame memory 704. The encoding-type deciding device 702 compares the input picture signal 716 and the predictive picture signal 719, thereby deciding which of an intra-frame encoding process and an inter-frame encoding process should be executed. The encoding-type deciding device 702 outputs an encoding mode signal 717 depending on the result of the decision.

The switch 703 has a movable contact and fixed contacts "a" and "b". The movable contact selectively touches either the fixed contact "a" or the fixed contact "b". The movable contact of the switch 703 is connected to the subtracter 706 and the adder 711. The fixed contact "a" of the switch 703 has no connection. The fixed contact "b" of the switch 703 is connected to the frame memory 704. The switch 703 is controlled by the encoding mode signal 717 outputted from the encoding-type deciding device 702. In the case where the encoding mode signal 717 represents that the intra-frame encoding process should be executed, the movable contact of the switch 703 is in touch with the fixed contact "a" thereof. Accordingly, in this case, the predictive picture signal 719 outputted by the frame memory 704 is inhibited from traveling to the subtracter 706 and the adder 711. In the case where the encoding mode signal 717 represents that the inter-frame encoding process should be executed, the movable contact of the switch 703 is in touch with the fixed contact "b" thereof. Accordingly, in this case, the predictive picture signal 719 is allowed to travel from the frame memory 704 to the subtracter 706 and the adder 711.

In the case where the inter-frame encoding process is selected, the subtracter 706 calculates the difference between the input picture signal 716 and the predictive picture signal 719. The subtracter 706 outputs an error signal representing the calculated difference. In the case where the intra-frame encoding process is selected, the input picture signal 716 passes through the subtracter 706 without being processed thereby.

The DCT device 707 receives the output signal of the subtracter 706. The DCT device 707 subjects the output signal of the subtracter 706 to discrete cosine transform (DCT), thereby outputting a signal representing DCT coefficients. The quantizer 708B receives the DCT coefficient signal from the DCT device 707, and quantizes the DCT coefficient signal in accordance with a quantization step size represented by an output signal 612 of the controller 606. The quantizer 708B outputs the quantization-resultant signal 607.

The encoder 712B receives the quantization-resultant signal 607 from the quantizer 708B. The encoder 712B receives the motion vector signal 720 from the motion vector estimator 701. The encoder 712B receives the encoding mode signal 717 from the encoding-type deciding device 702. The encoder 712B includes a first encoding section operating on the quantization-resultant signal 607, a second encoding section operating on the motion vector signal 720, a third encoding section operating on the encoding mode signal 717, and a multiplexing section. Specifically, the device 712B encodes the quantization-resultant signal 607 into corresponding words of a variable length code, that is, a first encoding-resultant signal 608. The first encoding-resultant signal 608 is referred to as a bit sequence 608 representing DCT coefficient information. The device 712B encodes the motion vector signal 720 into corresponding words of a variable length code, that is, a second encoding-resultant signal. The device 712B encodes the encoding mode signal 717 into corresponding words of a variable length code, that is, a third encoding-resultant signal. The encoder 712B multiplexes the second encoding-resultant signal and the third encoding-resultant signal into a bit sequence 609 representing overhead information. The encoder 712B outputs the DCT coefficient information bit sequence 608 and the overhead information bit sequence 609.

The inverse quantizer 709 receives the quantization-resultant signal 607 from the quantizer 708B. The device 709 subjects the quantization-resultant signal 607 to an inverse quantization process, thereby recovering a DCT coefficient signal corresponding to the output signal of the DCT device 707. The inverse DCT device 710 receives the recovered DCT coefficient signal from the inverse quantizer 709. The device 710 subjects the recovered DCT coefficient signal to inverse DCT, thereby converting the DCT coefficient signal back to an error signal corresponding to the output signal of the subtracter 706. The inverse DCT device 710 outputs the error signal to the adder 711. In the case where the inter-frame encoding process is selected, the adder 711 receives the predictive picture signal 719 from the frame memory 704 and combines the error signal and the predictive picture signal 719 into a picture signal corresponding to the input picture signal 716. In the case where the intra-frame encoding process is selected, the error signal passes through the adder 711 without being processed thereby. In this way, the adder 711 recovers a picture signal corresponding to the input picture signal 716. The adder 711 outputs the recovered picture signal to the frame memory 704. The recovered picture signal is written into the frame memory 704. The frame memory 704 is controlled by the address controller 705, thereby generating the immediately-preceding picture frame signal 718 and the predictive picture signal 719 on the basis of the recovered picture signal.

The sync signal generator 713 periodically produces and outputs a sync signal 610. The multiplexer 601 receives the DCT coefficient information bit sequence 608 from the encoder 712B. The multiplexer 601 receives the sync signal 610 from the sync signal generator 713. The device 601 multiplexes the DCT coefficient information bit sequence 608 and the sync signal 610 into a first composite information signal. The error-correction-code adder 603 receives the first composite information signal from the multiplexer 601. The device 603 adds an error correction signal or words of an error correction code to the first composite information signal, thereby converting the first composite information signal into a second composite information signal. The error-correction-code adder 603 outputs the second composite information signal to a transmission line.

The multiplexer 602 receives the overhead information bit sequence 609 from the encoder 712B. The multiplexer 602 receives the sync signal 610 from the sync signal generator 713. The device 602 multiplexes the overhead information bit sequence 609 and the sync signal 610 into a third composite information signal. The error-correction-code adder 604 receives the third composite information signal from the multiplexer 602. The device 604 adds an error correction signal or words of an error correction code to the third composite information signal, thereby converting the third composite information signal into a fourth composite information signal. The error-correction-code adder 604 outputs the fourth composite information signal to a transmission line.

The number of bits composing the error correction code signal added to the third composite information signal (the overhead information or the first-priority information) is greater than the number of bits composing the error correction code signal added to the first composite information signal (the DCT coefficient information or the second-priority information). Therefore, the overhead information (the first-priority information) is higher than the DCT coefficient information (the second-priority information) in ability to withstand an error or errors which occur during the transmission thereof.

The calculator 605 receives the second composite information signal from the error-correction-code adder 603. The calculator 605 receives the fourth composite information signal from the error-correction-code adder 604. The device 605 calculates the number of bits of the second composite information signal which occur per unit time interval, that is, the rate of the occurrence of bits in the second composite information signal. It should be noted that the second composite information signal relates to the DCT coefficient information. Also, the device 605 calculates the number of bits of the fourth composite information signal which occur per unit time interval, that is, the rate of the occurrence of bits in the fourth composite information signal. It should be noted that the fourth composite information signal relates to the overhead information. Subsequently, the device 605 calculates the rate of the occurrence of bits in the second and fourth composite information signals by summing the calculated rates concerning the second and fourth composite information signals respectively. The calculator 605 outputs a signal 611 representing the calculated rate of the occurrence of bits in the second and fourth composite information signals.

The controller 606 receives the bit rate signal 611 from the calculator 605. The controller 606 generates the quantization step size signal 612 in response to the bit rate signal 611. The controller 606 outputs the quantization step size signal 612 to the quantizer 708B. Accordingly, the quantization step size used by the quantizer 708B is increased and decreased as the calculated rate of the occurrence of bits in the second and fourth composite information signals rises and drops respectively. The increase and the decrease in the quantization step size cause a drop and a rise in the rate of the occurrence of bits in the second composite information signal (the DCT coefficient information). Accordingly, the actual rate of the occurrence of bits in the second and fourth composite information signals is controlled and maintained at essentially a constant rate.

It should be noted that the controller 606 may include a ROM. In this case, predetermined states of the quantization step size signal 612 are stored in storage segments of the ROM respectively, and the bit rate signal 611 is used as an address signal operating on the ROM.

What is claimed is:

1. A method of encoding a picture signal, comprising the steps of:

dividing an input picture signal into blocks;

grouping the blocks into groups each having a plurality of blocks;

encoding the input picture signal into a second picture signal block by block using a variable length code;

adding an error correction signal to the second picture signal for each of the groups; and adding a start address signal and a location address signal to the second picture signal for each of the groups, the start address signal representing a position of a bit within each of the groups, the location address signal representing a spatial position of a block within each of the groups.

2. A method as recited in claim 1, wherein each of the groups has a fixed number of bits.

3. A method of decoding a picture signal comprising the steps of:

detecting a sync signal in an input bit sequence;

detecting a location address signal and a start address signal in the input bit sequence in response to the detected sync signal;

recognizing a bit within a block in the input bit sequence as a start bit within a block in response to the location address signal and the start address signal, the bit being denoted by the start address signal, the block being denoted by the location address signal; and decoding the input bit sequence in response to recognizing said start bit.

4. The method for decoding as recited in claim 3, wherein the sync-signal detecting step comprises detecting a sync signal in the input bit sequence for each fixed number of bits, calculating a number of errors in the detected sync signal, comparing the calculated number of errors with a predetermined reference number, and regarding the detected sync signal as a correct sync signal when the calculated number of errors is smaller than the predetermined reference number.

5. An apparatus for encoding a picture signal, comprising:

means for dividing an input picture signal into blocks;

means for dividing an input picture signal into blocks;

means for grouping the blocks into groups each having a plurality of blocks;

means for encoding the input picture signal into a second picture signal block by block using a variable length code;

means for adding an error correction signal to the second picture signal for each of the groups;

means for generating a start address signal representing a position of a bit within each of the groups;

means for generating a location address signal representing a spatial position of a block within each of the groups; and means for adding the start address signal and the location address signal to the second picture signal for each of the groups.

6. A decoding apparatus comprising:

means for detecting a sync signal in an input bit sequence;

means for calculating a number of errors in the detected sync signal;

means for comparing the calculated number of errors with a predetermined reference number;

means for regarding the detected sync signal as a correct sync signal when the comparing means decides that the calculated number of errors is smaller than the predetermined reference number;

means for detecting a location address signal and a start address signal in the input bit sequence in response to the detected sync signal which is regarded as the correct sync signal;

means for recognizing a bit within a block in the input bit sequence as a start bit within the block in response to the location address signal and the start address signal, the bit being denoted by the start address signal, the block being denoted by the location address signal; and means for decoding the input bit sequence in response to said recognizing of said start bit.

7. A method of encoding a picture signal, comprising the steps of:

encoding an input picture signal into a second picture signal using a variable length code;

adding an error correction signal to the second picture signal to convert the second picture signal into a third picture signal;

detecting a rate of occurrence of bits in the third picture signal; and controlling a rate of occurrence of bits in the second picture signal in response to the detected rate of occurrence of bits in the third picture signal.

8. An apparatus for encoding a picture signal, comprising:

means for encoding an input picture signal into a second picture signal using a variable length code;

means for adding an error correction signal to the second picture signal to convert the second picture signal into a third picture signal;

means for detecting a rate of occurrence of bits in the third picture signal; and means for controlling a rate of occurrence of bits in the second picture signal in response to the detected rate of occurrence of bits in the third picture signal.

9. An apparatus for encoding a picture signal comprising:

means for dividing a first picture signal into blocks;

means for encoding the first picture signal into a second picture signal for each of the blocks using a variable length code;

means for grouping blocks of the second picture signal into groups including first and second groups, wherein the blocks of the second picture signal includes first, second, and third blocks, and wherein the first group includes a succession of the first block and a former part of the second block while the second group includes a succession of a latter part of the second block and the third block;

means for generating a start address signal representing a position of a head of the third block relative to the second group;

means for adding the start address signal to the second group in the second picture signal to convert the second picture signal to a third picture signal; and means for generating an error correction signal with respect to the third picture signal for each of the groups, and adding the generated error correction signal to the third picture signal for each of the groups.

10. An apparatus as recited in claim 9, further comprising means for generating a location address signal representing a position of the third block relative to a frame represented by the first picture signal, and means for adding the location address signal to the second group in the second picture signal.

11. An apparatus for decoding a picture signal comprising:

means for detecting a start address signal in each of groups of blocks in a picture signal;

means for detecting a head of a first undivided block in each of the block groups in response to the detected start address signal; and means for decoding the picture signal for each of the groups of blocks in response to the detected head of the first undivided block.

* * * * *

UNITED STATES PATENT AND TRADEMARK OFFICE
CERTIFICATE OF CORRECTION

PATENT NO. : 5,767,800
DATED : June 16, 1998
INVENTOR(S) : Yutaka Machida et al.

It is certified that error appears in the above-identified patent and that said Letters Patent is hereby corrected as shown below: On the title page: Item [73] Assignee: should read --Matsushita Electric Industrial Co., Ltd.--.

Signed and Sealed this

Seventeenth Day of October, 2000

Attest:

Q. TODD DICKINSON

Attesting Officer    Director of Patents and Trademarks